United States Patent
Foti

Patent Number: 5,839,064
Date of Patent: Nov. 17, 1998

[54] SYSTEM AND METHOD OF DYNAMIC ALLOCATION OF REDUNDANT PERIPHERAL EQUIPMENT GATEWAYS IN A RADIO TELECOMMUNICATIONS NETWORK

[75] Inventor: George Foti, Dollard des Ormeaux, Canada

[73] Assignee: Telefonaktiegolaget IM Ericsson, Stockholm, Sweden

[21] Appl. No.: 686,595

[22] Filed: Jul. 26, 1996

[51] Int. Cl.$^6$ .................................................. H04Q 7/38
[52] U.S. Cl. .................... 455/413; 455/412; 455/413; 455/426; 455/445; 455/432
[58] Field of Search .................. 455/413, 412, 455/433, 445, 414, 417, 432, 461, 212, 213

[56] References Cited

U.S. PATENT DOCUMENTS

| | | | |
|---|---|---|---|
| 5,177,780 | 1/1993 | Kasper et al. | 379/59 |
| 5,193,110 | 3/1993 | Jones et al. | 379/94 |
| 5,278,897 | 1/1994 | Mowery et al. | 379/212 |
| 5,400,390 | 3/1995 | Salin | 379/59 |
| 5,504,804 | 4/1996 | Widmark et al. | 379/59 |
| 5,506,888 | 4/1996 | Hayes et al. | 379/59 |
| 5,561,840 | 10/1996 | Alvsesalo et al. | 379/59 |
| 5,627,877 | 5/1997 | Penttonen | 379/58 |
| 5,699,407 | 12/1997 | Nguyen | 379/59 |
| 5,712,907 | 1/1998 | Wagner et al. | 379/112 |

Primary Examiner—David R. Hudspeth
Assistant Examiner—M. David Sofocleous
Attorney, Agent, or Firm—Steven W. Smith

[57] ABSTRACT

A radio telecommunications network for providing redundant interfaces from a mobile switching center (MSC) to an associated voice mail system (VMS) is disclosed. The radio telecommunications network includes a first peripheral equipment gateway (PEG-1) connected to the VMS, wherein the PEG-1 provides a first interface between the VMS and the radio telecommunications network, and a second peripheral equipment gateway (PEG-2) connected to the VMS, wherein the PEG-2 provides a second interface between the VMS and the radio telecommunications network. The MSC receives and routes an incoming call from a mobile station requesting voice mail retrieval, and a home location register (HLR) simultaneously sends routing request messages to PEG-1 and PEG-2, and includes an indication that the routing request messages are for voice mail retrieval. PEG-1 and PEG-2 return routing numbers for the VMS to the HLR. The HLR receives at least one routing number for the VMS, and the MSC delivers the incoming call to the VMS utilizing the first routing number received in the HLR.

7 Claims, 4 Drawing Sheets

SYSTEM AND METHOD OF DYNAMIC ALLOCATION OF REDUNDANT PERIPHERAL EQUIPMENT GATEWAYS IN A RADIO TELECOMMUNICATIONS NETWORK

BACKGROUND OF THE INVENTION

1. Technical Field of the Invention

This invention relates to radio telecommunications networks and, more particularly, to a radio telecommunications network providing redundant implementation of Voice Mail retrieval equipment.

2. Description of Related Art

In existing mobile telecommunication networks, a mobile subscriber is assigned a unique telephone number recognized by the public switched telephone network (PSTN). Calls from the PSTN to a particular mobile subscriber are routed by the PSTN to a gateway mobile switching center (G-MSC) which interrogates the subscriber's home location register (HLR) to obtain information regarding the location of the subscriber's mobile station, and other status information stored in a subscriber profile.

Prior to the introduction of Voice Mail categories for storing subscribers' Voice Mail numbers in mobile telecommunications networks in which Voice Mail services were offered, a mobile subscriber could retrieve his Voice Mail messages only if he was located in his home MSC, and traditional transfer services, for example, Transfer on Busy (TRB), Transfer on No Answer (TRN), and Call Transfer Immediate (CTR), were used for storing voice mail numbers. The home MSC utilized a block of software known as a Peripheral Equipment Gateway (PEG) to route Voice Mail calls to a Voice Mail System (VMS) through a voice trunk. Functionally, the PEG is an interface between the MSC and the VMS. The call would be established from the MSC where the subscriber was roaming, through the PEG to the VMS through a voice trunk using non-routable numbers. Thus, the subscriber had to be roaming within his home area to be able to retrieve his voice mail. If the MSC, including the PEG connected to the VMS malfunctioned or became inoperative, an alternate route could be established through another PEG to access the VMS. This redundancy was achievable through the Signaling System 7 (SS7) communications protocol and optionally through exchange data.

Voice Mail categories were later added for storing subscribers' Voice Mail numbers. Voice Mail categories provide the capability of replacing non-routable numbers with routable numbers. Thereafter, mobile subscribers could retrieve their mail from the service areas of MSCs other than their home MSC by entering a short code (for example #26) without having to dial their whole Voice Mail number. Additionally, Voice Mail categories gave the telecommunications network the ability to identify a transfer to Voice Mail distinctly from other transfer services such as TRB or TRN.

By adding the extra capabilities associated with Voice Mail categories, however, PEG redundancy was lost for subscribers utilizing Voice Mail categories to store their Voice Mail numbers. Therefore, in existing mobile telecommunications networks, if the PEG is inoperative or malfunctioning, mobile subscribers who are using Voice Mail categories to store their Voice Mail numbers, are not able to reach the Voice Mail System. On the other hand, subscribers who are utilizing the more limited normal transfer service to store their Voice Mail numbers continue to have access to Voice Mail. PEG redundancy is still provided through SS7 or exchange data. The lack of PEG redundancy for subscribers with Voice Mail categories has discouraged the use of Voice Mail categories due to the possibility of losing all Voice Mail services when their PEG fails.

Although there are no known prior art teachings of a solution to the aforementioned deficiency and shortcoming such as that disclosed herein, a prior art reference that discusses subject matter that bears some relation to matters discussed herein is U.S. Pat. No. 5,193,110 to Jones et al. (Jones). Jones discloses a telephone communication system supporting a plurality of applications. Specifically, the patent provides for an integrated services platform for a telephone communication system for a plurality of application processing ports for providing different types of information servers such as E-mail, videotex, residential call answering, home shopping, classified advertising, trucking dispatch, doctor's register and automated attendant. Thus, Jones is essentially an enhanced Voice Mail machine, and does not teach or suggest modifications within a mobile telecommunications network to enable Voice Mail retrieval on a network or Voice Mail retrieval across different nodes on a wide area network.

It would be a distinct advantage to have a cellular telecommunications network capable of providing PEG redundancy through Voice Mail categories. Additionally, it would be beneficial to the mobile subscriber to have a capability to access Voice Mail service in a visited MSC. It is an object of the present invention to provide such a cellular telecommunications network.

SUMMARY OF THE INVENTION

The present invention is a system and method of providing peripheral equipment gateway redundancy and dynamic allocation of the peripheral equipment gateways in a radio telecommunication network. In one aspect, the present invention is a method of providing redundant interfaces from a mobile switching center (MSC) to an associated voice mail system (VMS). The method begins by connecting a first peripheral equipment gateway (PEG-1) to a VMS, wherein the PEG-1 provides a first interface between the VMS and the radio telecommunications network, and connecting a second peripheral equipment gateway (PEG-2) to the VMS, wherein the PEG-2 provides a second interface between the VMS and the radio telecommunications network. This is followed by receiving an incoming call in the MSC from the mobile station requesting voice mail retrieval, and transmitting a location request message from the MSC to a home location register (HLR), the location request message including an indicator that the location request message is for voice mail retrieval. This is followed by simultaneously transmitting, from the HLR, a first request for a routing number for the VMS to PEG-1, and a second request for a routing number for the VMS to PEG-2, the first and second requests for a routing number including an indicator that the requests are for voice mail retrieval. The method continues by receiving, in the HLR, at least one routing number for the VMS, and delivering the incoming call to the VMS utilizing the first routing number received in the HLR.

In another aspect, the present invention is a radio telecommunications network providing redundant interfaces from a mobile switching center (MSC) to an associated voice mail system (VMS). The radio telecommunications network includes a first peripheral equipment gateway (PEG-1) connected to the VMS, wherein the PEG-1 provides a first interface between the VMS and the radio telecommunications network, and a second peripheral equipment gateway (PEG-2) connected to the VMS, wherein the PEG-2 provides a second interface between the VMS and the radio telecommunications network. The network also includes a switching means within the MSC for receiving and routing an incoming call from a mobile station requesting voice mail retrieval, a home location register (HLR) for requesting routing numbers for the VMS and returning the routing numbers to the MSC, and a means for simultaneously transmitting, from the HLR, a first request for a routing number for the VMS to the PEG-1, and a second request for a routing number for the VMS to the PEG-2, the first and second requests for a routing number including an indicator that the requests are for voice mail retrieval. Finally, the network includes means for receiving, in the HLR, at least one routing number for the VMS, and means for delivering the incoming call to the VMS utilizing the first routing number received in the HLR.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is a system and method of providing peripheral equipment gateway redundancy and dynamic allocation of the peripheral equipment gateways in a radio telecommunication network.

Figure 1:
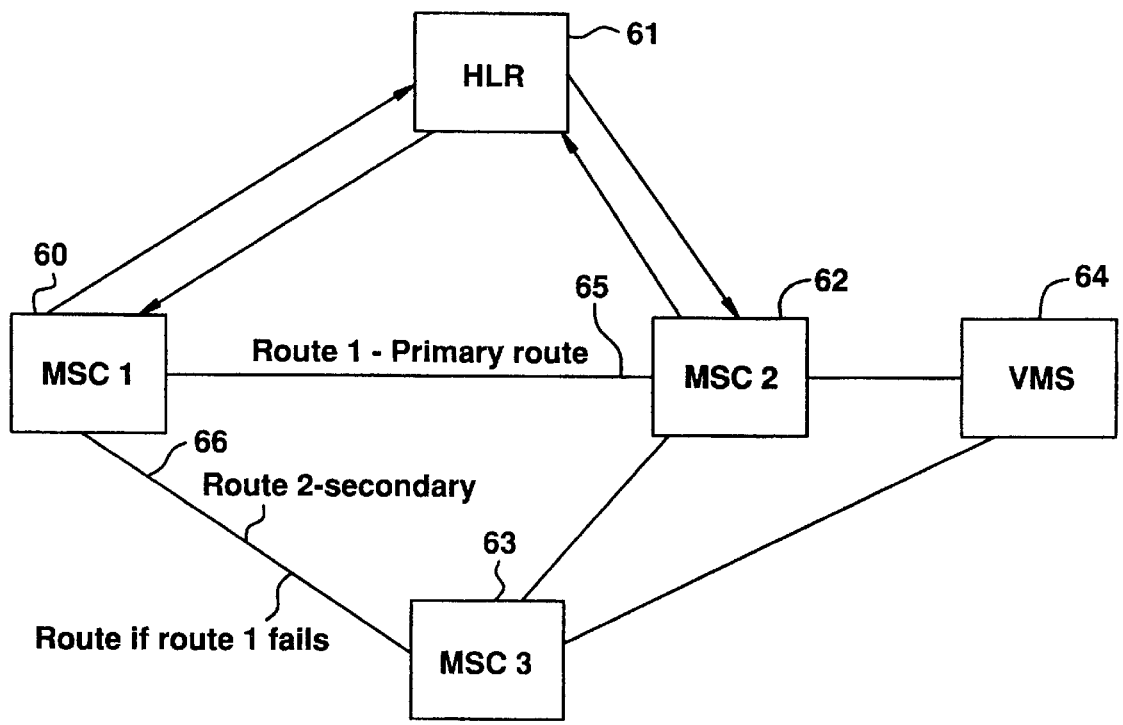
FIG. 1 (Prior Art) is a simplified block diagram illustrating an existing system which utilizes a secondary MSC to provide routing redundancy between a first MSC and a Voice Mail System (VMS)

FIG. 1 is a simplified block diagram illustrating an existing system which utilizes a secondary MSC to provide routing redundancy between a first MSC and a Voice Mail System (VMS) 64. (MSC-1) 60 normally accesses the VMS 64 through (MSC-2) 62 by using the primary route (Route 1) 65. However, a secondary route (Route 2) 66 is provided when MSC-2 malfunctions or becomes inoperative. (Route 2) 66 provides a redundant means for MSC-1 to communicate with the VMS 64. MSC-1 routes its messages through (MSC-3) 63 in order to access the VMS 64. Route-2 provides this access automatically, entirely through the standard SS7 network configuration.

Figure 2:
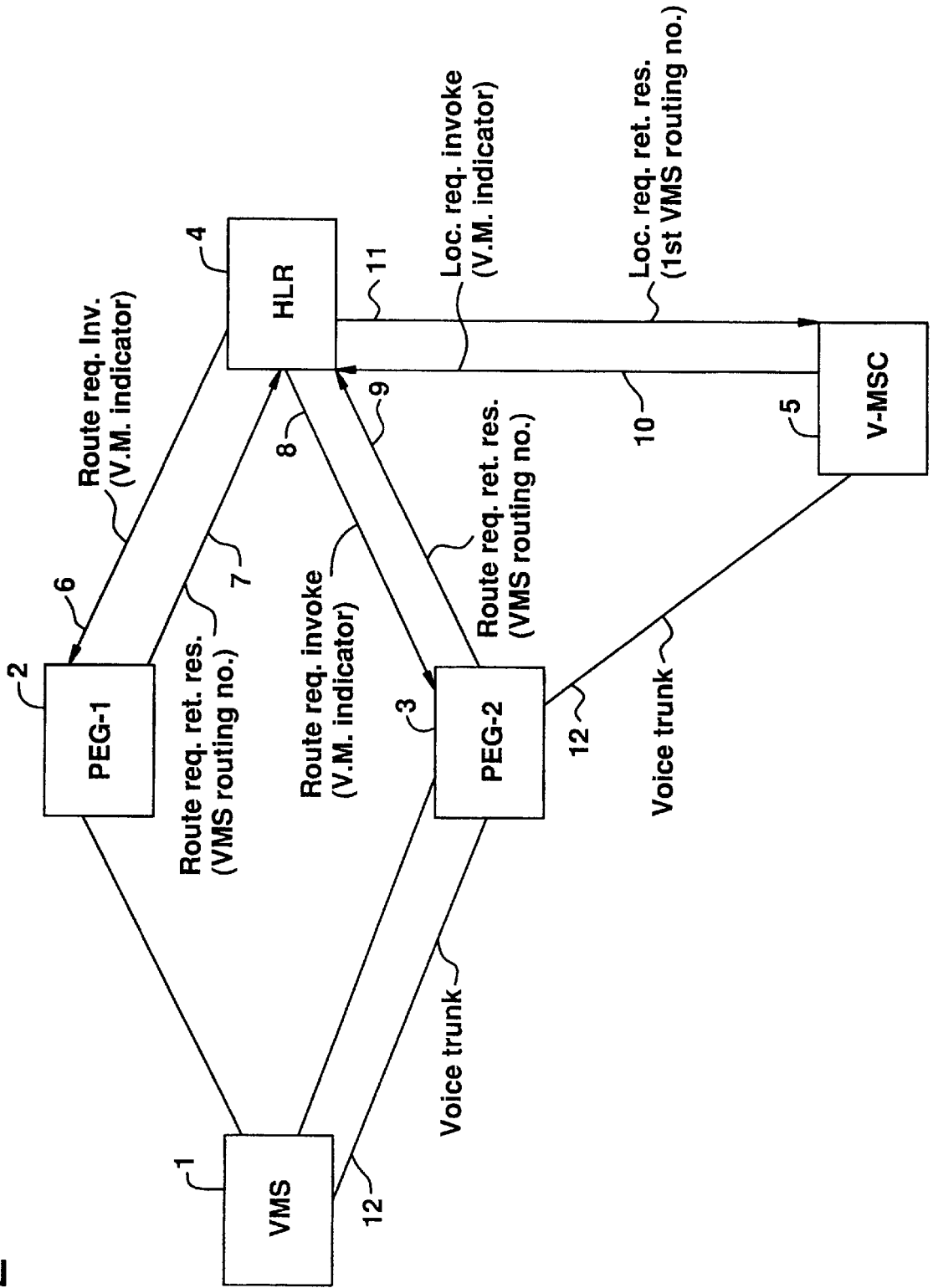
FIG. 2 is a simplified block diagram illustrating the components of a cellular telecommunications network involved in providing redundant peripheral equipment gateways (PEGs) associated with a VMS in the preferred embodiment of the present invention.

FIG. 2 is a simplified block diagram illustrating the components of a cellular telecommunications network involved in providing redundant peripheral equipment gateways (PEGs) associated with a Voice Mail System (VMS) in the preferred embodiment of the present invention. The components consist of a VMS 1 which is accessed by at least one PEG. In the preferred embodiment of the present invention, two PEGs are utilized, designated (PEG-1) 2 and (PEG-2) 3. A Visited Mobile Switching Center (V-MSC) 5 sends a Location Request (LocReq) Invoke message 10 to a Home Location Register (HLR) 4. The LocReq Invoke message includes a voice mail retrieval indicator to indicate the subscriber's desire to retrieve voice mail. The HLR 4 is programmed to simultaneously send two routing request invoke messages 6 and 8 to PEG-1 and PEG-2, respectively. PEG-1 responds with a Routing Request Return Result message 7, and PEG-2 responds with a Routing Request Return Result message 9. The HLR 4 then sends a Location Request Return Result message 11 to the V-MSC 5. The Location Request Return Result message provides routing information in order to establish a voice trunk 12 between VMS 1 and V-MSC 5 via the first PEG to respond.

Figure 3:
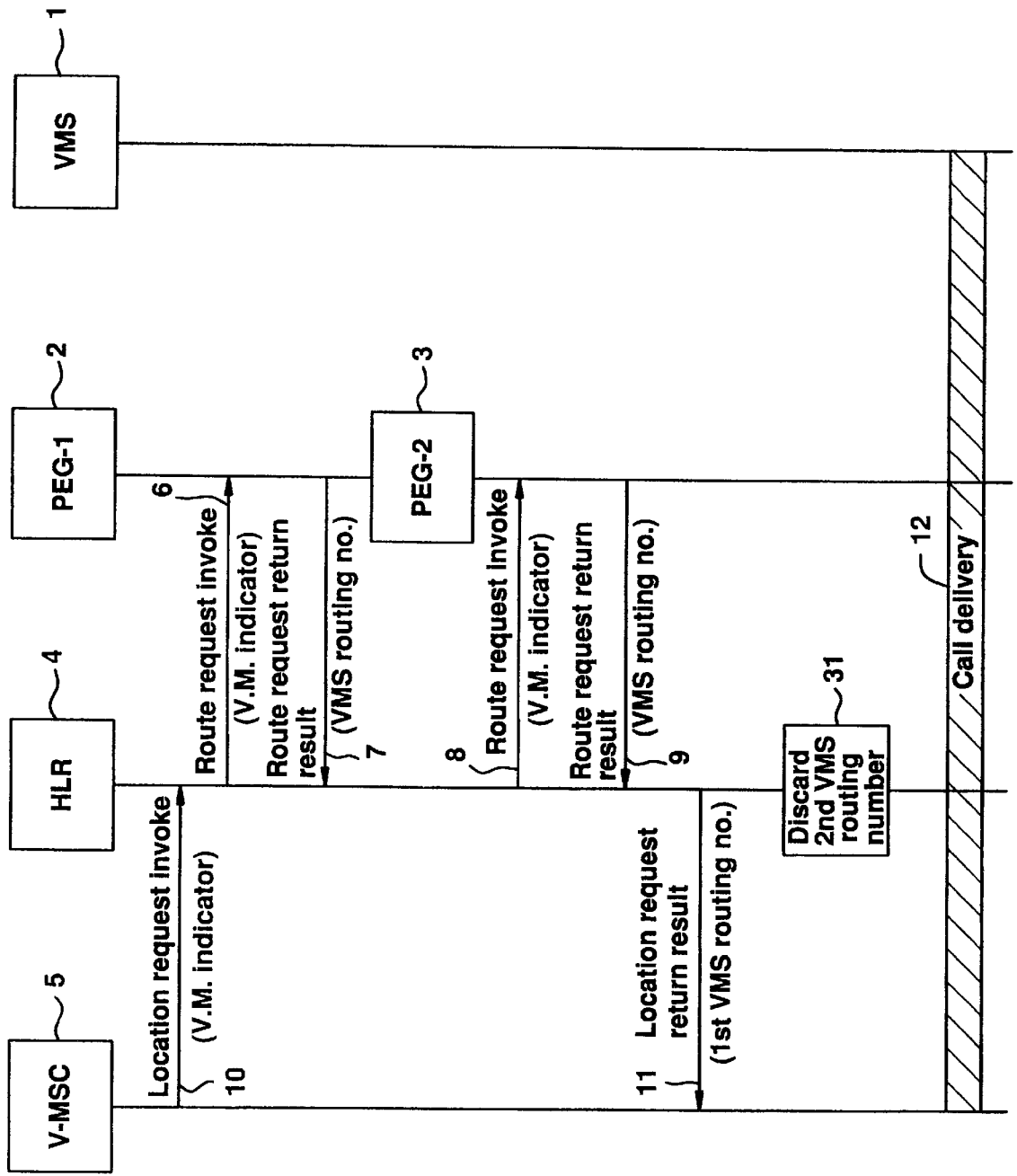
FIG. 3 is a signaling diagram illustrating the flow of messages between various nodes in a telecommunications network during voice message retrieval in the preferred embodiment of the of the present invention.

FIG. 3 is a signaling diagram illustrating the flow of messages between various nodes in a cellular telecommunications network during voice message retrieval in the preferred embodiment of the present invention. The process begins when a Visited Mobile Switching Center (V-MSC) 5 sends a Location Request (LocReq) Invoke message 10 to a Home Location Register (HLR) 4. The LocReq Invoke message 10 is used to obtain routing information for the Voice Mail System 1, and is utilized for voice mail retrieval. This is achieved by including a voice mail indicator in the LocReq message. The HLR 4 then sends two Routing Request (RouteReq) Invoke messages 6 and 8 simultaneously to a primary Peripheral Equipment Gateway (PEG-1) 2 and to a secondary Peripheral Equipment Gateway (PEG-2) 3, and includes an indicator in each RouteReq messages that the message is for voice mail retrieval. Both PEG-1 and PEG-2 are defined in the HLR 4 for each subscriber. Each PEG responds with a Routing Request Return Result message 7 and 9. Each Routing Request Return Result message includes a routing number to be utilized for the Voice Mail call. The routing number that is returned to the HLR 4 by the first PEG to respond is returned to the V-MSC 5 in a Location Request Return Result message 11. The routing number from the second PEG to respond is discarded at 31. The Voice Mail call is then delivered to the VMS over voice trunk 12. In this manner, it can be seen that if PEG-1 or PEG-2 is inoperative, and does not return a Routing Number, the Routing Number returned by the operative PEG is utilized for call delivery. Thus, PEG redundancy is provided, even when Voice Mail categories are utilized for storing Voice Mail numbers.

Figure 4:
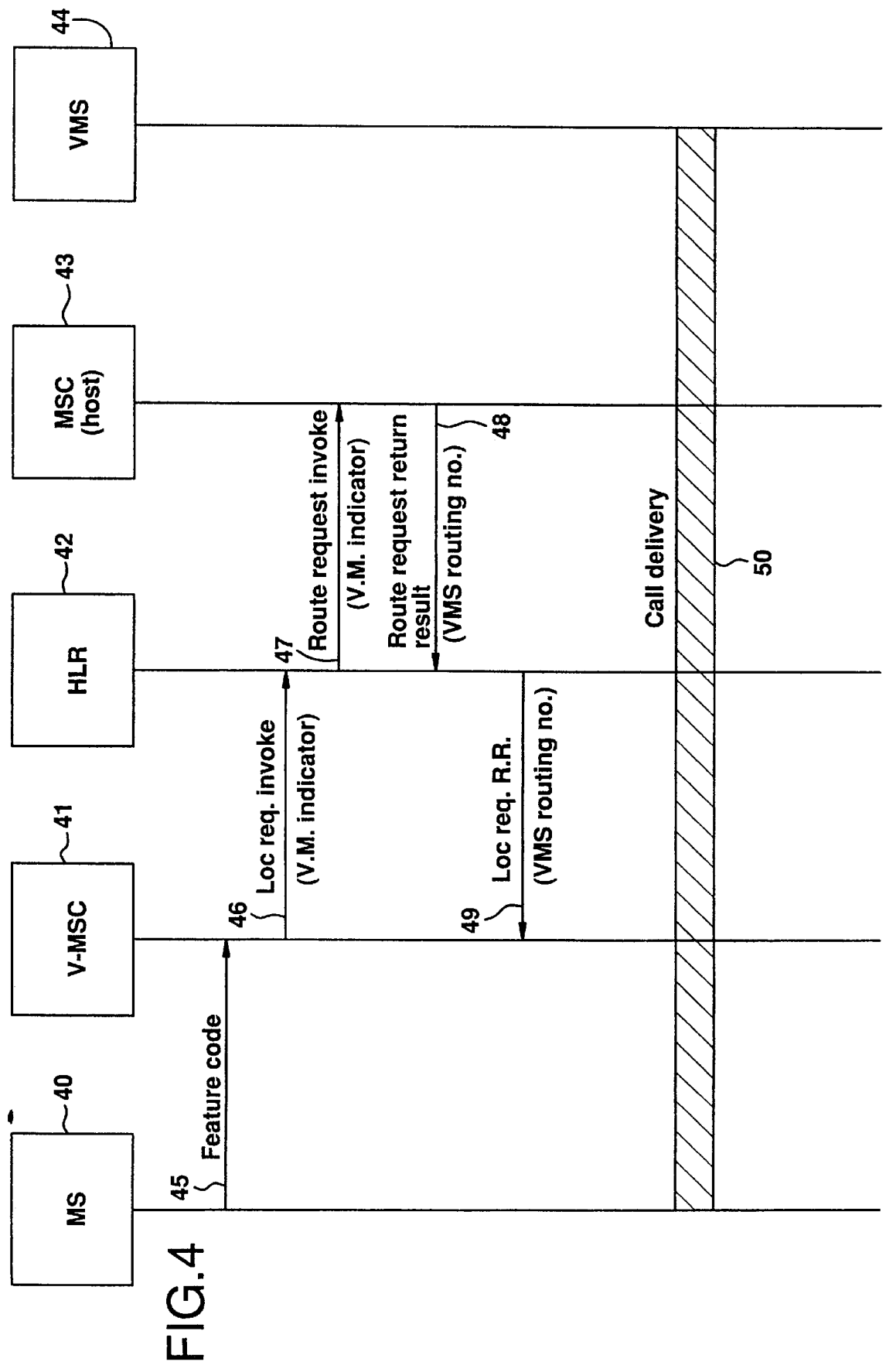
FIG. 4 is a signaling diagram illustrating the flow of messages between various nodes in a cellular telecommunications network during invocation of voice mail retrieval using a feature code.

FIG. 4 is a signaling diagram illustrating the invocation of the Voice Mail Retrieval feature by the entry of a feature code by the mobile subscriber in the preferred embodiment of the present invention. The process begins when the mobile subscriber 40 enters a feature code 45 and sends the feature code 45 to the V-MSC 41. V-MSC 41 sends a Location Request Invoke message 46 with an indicator that the message is for voice mail retrieval to a HLR 42. Next, the HLR 42 sends a Routing Request Invoke message 47 to a host MSC 43 having a Voice Mail System (VMS) 44. The Routing Request Invoke message is used to support call delivery. The voice mail message parameter indicator is included by the HLR to convey information on Voice Mail services subscribed to by mobile subscriber 40. The host MSC 43 returns a Routing Request Return Result message 48 to the HLR 42 and includes a routing number for the VMS 44. Next, the HLR 42 sends a LocReq Return Request message 49 to the V-MSC 41 and includes the routing number for the VMS 44. Call delivery 50 is then completed between V-MSC 41 and the VMS 44.

It is thus believed that the operation and construction of the present invention will be apparent from the foregoing description. While the system shown and described has been characterized as being preferred, it will be readily apparent that various changes and modifications could be made therein without departing from the spirit and scope of the invention as defined in the following claims.

What is claimed is:

1. In a radio telecommunications network, a method of providing redundant interfaces from a mobile switching center (MSC) to an associated voice mail system (VMS), said method comprising the steps of:

connecting a first peripheral equipment gateway (PEG-1) to said VMS, said PEG-1 providing a first interface between said VMS and said radio telecommunications network;

connecting a second peripheral equipment gateway (PEG-2) to said VMS, said PEG-2 providing a second interface between said VMS and said radio telecommunications network;

receiving an incoming call for said VMS in said MSC;

transmitting a location request message from said MSC to a home location register (HLR), said location request message including an indicator that said location request message is for voice mail retrieval;

simultaneously transmitting, from said HLR, a first request for a routing number for said VMS to said PEG-1, and a second request for a routing number for said VMS to said PEG-2, said first and second requests for a routing number including an indicator that said requests are for voice mail retrieval;

receiving, in said HLR, at least one routing number for said VMS; and delivering said incoming call to said VMS utilizing the first routing number received in said HLR.

2. The method of claim 1 further comprising, after the step of receiving, in said HLR, at least one routing number for said VMS, the step of returning to said MSC, the first routing number received in said HLR.

3. A radio telecommunications network providing redundant interfaces from a mobile switching center (MSC) to an associated voice mail system (VMS), said network comprising:

a first peripheral equipment gateway (PEG-1) connected to said VMS, said PEG-1 providing a first interface between said VMS and said radio telecommunications network;

a second peripheral equipment gateway (PEG-2) connected to said VMS, said PEG-2 providing a second interface between said VMS and said radio telecommunications network;

switching means within said MSC for receiving and routing an incoming call from a mobile station requesting voice mail retrieval;

a home location register (HLR) for requesting routing numbers for said VMS and returning said routing numbers to said MSC;

means for simultaneously transmitting, from said HLR, a first request for a routing number for said VMS to said PEG-1, and a second request for a routing number for said VMS to said PEG-2, said first and second requests for a routing number including an indicator that said requests are for voice mail retrieval;

means for receiving, in said HLR, at least one routing number for said VMS; and means for delivering said incoming call to said VMS utilizing the first routing number received in said HLR.

4. The radio telecommunications network of claim 3 wherein said means for simultaneously transmitting, from said HLR, a first request for a routing number for said VMS to said PEG-1, and a second request for a routing number for said VMS to said PEG-2 includes means within said HLR for associating said incoming call from said mobile station requesting voice mail retrieval with two different routes for requesting routing numbers for said VMS.

5. The radio telecommunications network of claim 4 further comprising means for returning to said MSC, the first routing number received in said HLR.

6. In a radio telecommunications network, a method of providing redundant interfaces from a mobile switching center (MSC) to an associated voice mail system (VMS), said method comprising the steps of:

connecting a first peripheral equipment gateway (PEG-1) to said VMS, said PEG-1 providing a first interface between said VMS and said radio telecommunications network;

connecting a second peripheral equipment gateway (PEG-2) to said VMS, said PEG-2 providing a second interface between said VMS and said radio telecommunications network;

receiving an incoming call for said VMS in said MSC;

transmitting a location request message from said MSC to a home location register (HLR), said location request message including an indicator that said location request message is for voice mail retrieval;

simultaneously transmitting from said HLR, a first request for a routing number for said VMS to said PEG-1, and a second request for a routing number for said VMS to said PEG-2, said first and second requests for a routing number including an indicator that said requests are for voice mail retrieval;

receiving, in said HLR, at least one routing number for said VMS;

returning to said MSC, the first routing number received in said HLR;

determining whether a second routing number for said VMS was received in said HLR;

discarding, upon determining that a second routing number was received in said HLR, said second routing number; and delivering said incoming call to said VMS utilizing the first routing number received in said HLR.

7. A radio telecommunications network providing redundant interfaces from a mobile switching center (MSC) to an associated voice mail system (VMS), said network comprising:

a first peripheral equipment gateway (PEG-1) connected to said VMS, said PEG-1 providing a first interface between said VMS and said radio telecommunications network;

a second peripheral equipment gateway (PEG-2) connected to said VMS, said PEG-2 providing a second interface between said VMS and said radio telecommunications network;

switching means within said MSC for receiving and routing an incoming call from a mobile station requesting voice mail retrieval;

a home location register (HLR) for requesting routing numbers for said VMS and returning said routing numbers to said MSC;

means for simultaneously transmitting, from said HLR, a first request for a routing number for said VMS to said PEG-1, and a second request for a routing number for said VMS to said PEG-2, said first and second requests for a routing number including an indicator that said requests are for voice mail retrieval, said simultaneous transmitting means including means within said HLR for associating said incoming call from said mobile station requesting voice mail retrieval with two different routes for requesting routing numbers for said VMS;

means for receiving, in said HLR, at least one routing number for said VMS;

means for returning to said MSC, the first routing number received in said HLR;

means within said HLR for determining whether a second routing number for said VMS was received in said HLR;

means for discarding said second routing number upon determining that a second routing number was received in said HLR; and means for delivering said incoming call to said VMS utilizing the first routing number received in said HLR.

* * * * *